(12) United States Patent
Zones

(10) Patent No.: US 10,112,839 B2
(45) Date of Patent: Oct. 30, 2018

(54) METHOD OF PREPARING MOLECULAR SIEVE SSZ-85

(71) Applicant: Chevron U.S.A. Inc., San Ramon, CA (US)

(72) Inventor: Stacey Ian Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/716,786

(22) Filed: Sep. 27, 2017

(65) Prior Publication Data

US 2018/0127281 A1    May 10, 2018

Related U.S. Application Data

(60) Provisional application No. 62/419,571, filed on Nov. 9, 2016.

(51) Int. Cl.
*C01B 39/54* (2006.01)
*C01B 37/06* (2006.01)

(52) U.S. Cl.
CPC ............ *C01B 37/065* (2013.01); *C01B 39/54* (2013.01)

(58) Field of Classification Search
CPC ...................................................... C01B 39/48
See application file for complete search history.

(56) References Cited

U.S. PATENT DOCUMENTS

| 9,359,217 | B2 * | 6/2016 | Zones | ...................... C01B 39/54 |
| 2014/0171713 | A1 | 6/2014 | Moscoso et al. | |
| 2014/0227171 | A1 * | 8/2014 | Zones | ................... C01B 37/065 |
| | | | | 423/704 |

FOREIGN PATENT DOCUMENTS

| WO | 9613460 A1 | 5/1996 |
| WO | 2006037437 A1 | 4/2006 |
| WO | 2014123610 | 8/2014 |
| WO | 2014123610 A1 | 8/2014 |

OTHER PUBLICATIONS

PCT International Search Report, International Patent Appl. No. PCT/US2017/053633, dated Jan. 23, 2018.

* cited by examiner

*Primary Examiner* — David M Brunsman
(74) *Attorney, Agent, or Firm* — Terrence M. Flaherty

(57) ABSTRACT

A method is disclosed for preparing molecular sieve SSZ-85 in the absence of a source of fluoride ions.

4 Claims, 2 Drawing Sheets

METHOD OF PREPARING MOLECULAR SIEVE SSZ-85

CROSS-REFERENCE TO RELATED APPLICATIONS

This application claims the benefit of U.S. Provisional Application Ser. No. 62/419,571, filed on Nov. 9, 2016, the disclosure of which is incorporated by reference in its entirety.

TECHNICAL FIELD

This disclosure is directed to a method of preparing molecular sieve SSZ-85 in the absence of a source of fluoride ions.

BACKGROUND

Because of their unique sieving characteristics as well as their catalytic properties, crystalline molecular sieves and zeolites are especially useful in applications such as hydrocarbon conversion, gas drying and separation.

Cobalt aluminophosphate molecular sieve SSZ-85 and its synthesis are disclosed in U.S. Pat. No. 9,359,217. However, the reaction mixtures described in U.S. Pat. No. 9,359,217 require the presence of fluoride ions, which in commercial operations is disadvantageous in that they may lead to extra safety and cost considerations.

The present disclosure provides a method of preparing molecular sieve SSZ-85 in the absence of a source of fluoride ions.

SUMMARY

In one aspect, there is provided a method of preparing a molecular sieve SSZ-85, the method comprising contacting under crystallization conditions a reaction mixture comprising a source of cobalt; a source of aluminum; a source of phosphorus; and an ionic liquid comprising a 1,3-diisopropylimidazolium cation; wherein the reaction mixture is substantially free of fluoride ions.

In another aspect, there is provided a cobalt aluminophosphate molecular sieve having the structure of SSZ-85 and, in its as-synthesized form, being substantially free of fluoride ions.

DETAILED DESCRIPTION

Introduction

Figure 1:
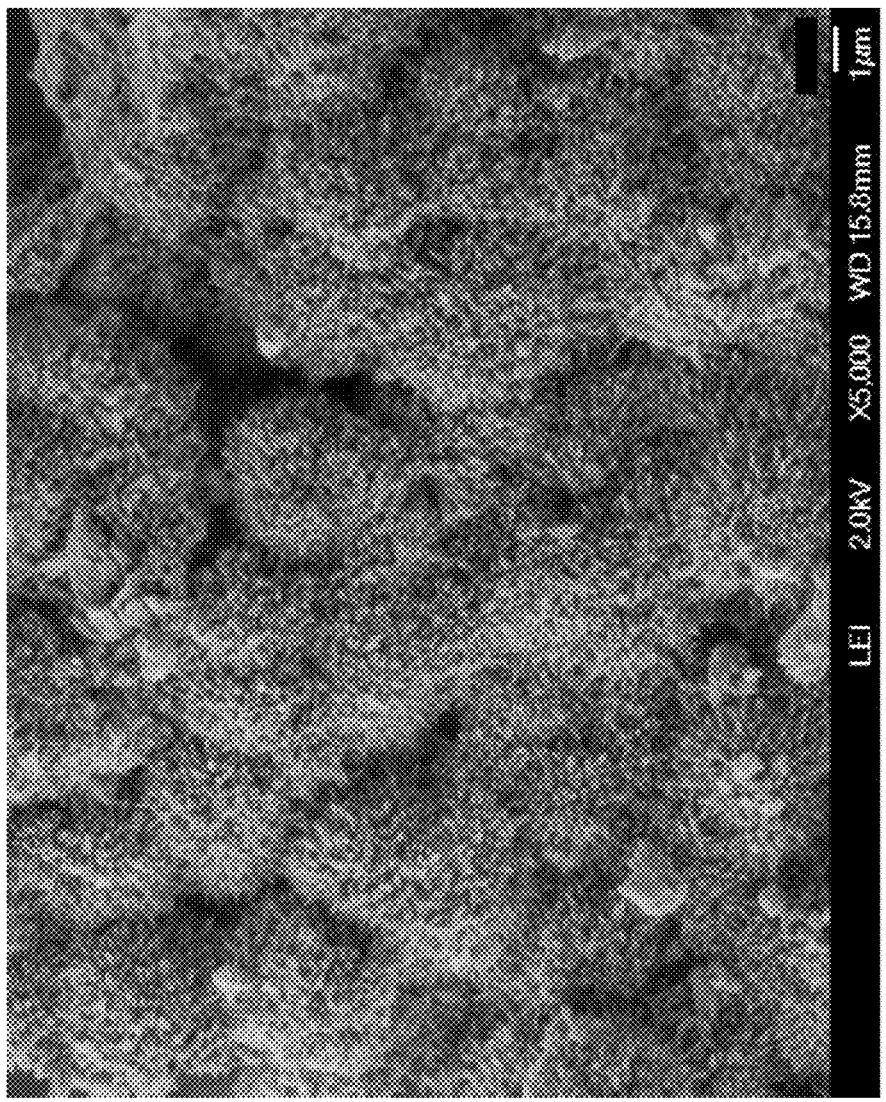
FIG. 1 is a scanning electron micrograph (SEM) image of the as-synthesized molecular sieve prepared in Example 1.

The following terms will be used throughout the specification and will have the following meanings unless otherwise indicated.

The term "ionic liquid" refers to a salt which is liquid at temperatures below 100° C., in particular at room temperature. Such liquid salts typically comprise organic cations and organic or inorganic anions. Ionic liquids have a number of interesting properties: usually, they are thermally stable, relatively non-flammable and have a low vapor pressure. They also show good solvability for numerous organic and inorganic substances.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the term "substantially free of fluoride ions" means that the reaction mixture contains less than 100 wppm (e.g., less than 50 wppm, less than 25 wppm, less than 10 wppm, or no measurable quantity) of fluoride ions.

Reaction Mixture

In general, molecular sieve SSZ-85 is prepared by contacting under crystallization conditions a reaction mixture comprising (1) a source of cobalt; (2) a source of aluminum; (3) a source of phosphorus; and (4) an ionic liquid comprising a 1,3-diisopropylimidazolium cation; wherein the reaction mixture is substantially free of fluoride ions.

The composition of the reaction mixture from which the molecular sieve is formed, expressed in molar ratios, is identified in Table 1 below:

TABLE 1

| Reactants | Broad | Exemplary |
|---|---|---|
| CoO/Al$_2$O$_3$ | 0.05 to 0.5 | 0.05 to 0.50 |
| P$_2$O$_5$/(CoO + Al$_2$O$_3$) | 0.5 to 1.5 | 0.8 to 1.2 |
| [Q$^+$A$^-$]/(CoO + Al$_2$O$_3$) | 1 to 100 | 2 to 50 | wherein [Q$^+$A$^-$] represents an ionic liquid comprising a 1,3-diisopropylimidazolium cation (Q$^+$) and an anion (A$^-$) which is not detrimental to the formation of the molecular sieve. Representative anions may include halides other than fluoride (e.g., chloride, bromide, and/or iodide), acetates, phosphates, phosphinates, aluminates, borates, sulfates, sulfonates, imides, amides, and cyanates. Suitable ionic liquids may include, for example, 1,3-diisopropylimidazolium chloride and 1,3-diisopropylimidazolium bromide.

In some embodiments, the CoO:Al$_2$O$_3$ molar ratio may be in a range of 0.1 to 0.2.

Suitable sources of cobalt include cobalt salts, such as bromides, chlorides, nitrates, sulfates, and carboxylates.

Suitable sources of aluminum include aluminum alkoxides (e.g., aluminum isopropoxide), precipitated aluminas, aluminum metal, aluminum hydroxide, aluminum salts and alumina sols.

Suitable sources of phosphorus source include phosphoric acid and phosphorus oxides.

The reaction mixture may also contain seeds of a molecular sieve material, such as SSZ-85, from a previous synthesis, desirably in an amount of from 0.01 to 10,000 ppm by weight (e.g., from 100 to 5000 ppm by weight) of the reaction mixture.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the synthesis conditions.

Crystallization and Post-Synthesis Treatment

Conventional hydrothermal synthesis of (metallo)aluminophosphate molecular sieves is normally conducted by initially producing a reaction mixture comprising water, an organic structure directing agent (typically a nitrogen-containing organic base, such as a quaternary ammonium salt or hydroxide), a source of aluminum, phosphoric acid and, optionally, a source of silicon or other metal. The resulting gel mixture is then subjected to hydrothermal conditions (i.e., temperatures above 100° C. and pressures above atmospheric pressure) in a sealed vessel to induce crystallization. The crystalline product is then recovered by filtration or centrifugation.

In contrast to conventional hydrothermal synthesis where the solvent is water, molecular sieve SSZ-85 is prepared herein by ionothermal synthesis where an ionic liquid is used as both the solvent and the structure directing agent in the formation of solids.

Crystallization of the molecular sieve SSZ-85 from the above reaction mixture can be carried at either static or stirred conditions in a suitable reactor vessel, such as, for example, polypropylene jar or Teflon-lined or stainless steel autoclaves, at a temperature of from 100° C. to 200° C. (e.g., from 100° C. to 150° C., from 100° C. to 135° C., or from 110° C. to 135° C.) for a time sufficient for crystallization to occur at the temperature used (e.g., from 72 to 240 hours).

Once the molecular sieve crystals have formed, the solid product is recovered from the reaction mixture by standard mechanical separation techniques such as filtration or centrifugation. The crystals are water-washed and then dried to obtain the as-synthesized molecular sieve crystals. The drying step can be performed at atmospheric pressure or under vacuum. The drying step is typically performed at a temperature of less than 200° C.

The ionic liquid solvent can be recovered from the reaction mixture using any of a variety of techniques (e.g., solvent extraction, decantation) for subsequent use.

As a result of the crystallization process, the recovered crystalline molecular sieve product contains within its pore structure at least a portion of the structure directing agent used in the synthesis.

The as-synthesized SSZ-85 prepared as described herein may be subjected to subsequent treatment to remove part or all of the organic structure directing agent used in its synthesis. This can be conveniently effected by thermal treatment in which the as-synthesized material can be heated to a temperature in the range of 200° C. to 375° C. for between about 30 minutes and 20 hours (e.g., 2 to 8 hours). While sub-atmospheric and/or super-atmospheric pressures can be employed for the thermal treatment, atmospheric pressure can be desired for reasons of convenience. Alternatively, the organic structure directing agent can be removed by treatment with ozone as described by A. N. Parikh et al. (*Micropor. Mesopor. Mater.* 2004, 76, 17-22).

Characterization of the Molecular Sieve

In its as-synthesized form and on an anhydrous basis, molecular sieve SSZ-85 prepared as described herein is substantially free of fluoride ions and may be represented by the following empirical formula:

$$mQ^+ : (Co_x Al_y P_z) O_2$$

wherein (1) m is the number of moles of 1,3-diisopropylimidazolium cation ($Q^+$) per mole of $(Co_x Al_y P_z)O_2$, and $0<m\leq1$ (e.g., $0<m\leq0.5$, $0<m\leq0.4$, $0<m\leq0.3$, $0<m\leq0.2$, or $0<m\leq0.1$); (2) x, y, and z represent the mole fraction of Co, Al, and P, respectively, as tetrahedral units, (3) x, y, and z are each a value greater than zero and less than one and the sum of x, y, and z is one.

In one embodiment, $0.01\leq x\leq0.5$, $0.25\leq y\leq0.7$, and $0.25\leq z\leq0.7$. In another embodiment, $0.01\leq x\leq0.25$, $0.4\leq y\leq0.6$, and $0.4\leq z\leq0.6$.

As taught in U.S. Pat. No. 9,359,217, molecular sieve SSZ-85 is characterized by an X-ray diffraction pattern which, in the as-synthesized form of the molecular sieve, includes at least the lines set forth in Table 2 below and which, in the calcined form of the molecular sieve, includes at least the peaks set forth in Table 3 below.

TABLE 2

Characteristic Peaks for As-Synthesized SSZ-85

| 2-Theta[a] | d-Spacing, nm | Relative Intensity[b] |
|---|---|---|
| 9.38 | 0.9421 | M |
| 13.28 | 0.6661 | M |
| 18.22 | 0.4866 | S |
| 21.16 | 0.4196 | VS |
| 22.66 | 0.3921 | VS |
| 26.86 | 0.3317 | W |
| 28.42 | 0.3138 | W |
| 29.56 | 0.3020 | W |
| 30.00 | 0.2977 | W |
| 34.32 | 0.2611 | M |

[a]±0.20
[b]The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

TABLE 3

Characteristic Peaks for Calcined SSZ-85

| 2-Theta[a] | d-Spacing, nm | Relative Intensity[b] |
|---|---|---|
| 9.60 | 0.9208 | W |
| 13.62 | 0.6498 | VS |
| 18.66 | 0.4751 | VS |
| 20.34 | 0.4363 | W |
| 21.49 | 0.4133 | S |
| 23.14 | 0.3841 | VS |
| 27.29 | 0.3265 | W |
| 29.28 | 0.3047 | W |
| 30.42 | 0.2936 | M |
| 33.18 | 0.2698 | W |
| 35.01 | 0.2561 | W |

[a]±0.20
[b]The powder XRD patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in the lattice constants. In addition, sufficiently small crystals will affect the shape and intensity of peaks, leading to significant peak broadening. Minor variations can also result from variations in the organic compound used in the preparation. Notwithstanding these minor perturbations, the basic crystal lattice remains unchanged.

EXAMPLES

The following illustrative examples are intended to be non-limiting.

Example 1

A Teflon liner was charged with 1,3-diisopropylimidazolium bromide (1 g), aluminum isopropoxide (0.48 g) and cobalt acetate dihydrate (0.15 g) and mixed by gentle grinding with a ceramic pestle. Phosphoric acid (0.34 g) was then added to the mixture. No mixing was provided at this step. The liner was capped and placed within a Parr steel autoclave reactor. The autoclave was placed in an oven and heated at 120° C. for 5 days under static conditions. The solid products were recovered from the cooled reactor by filtration, washed with deionized water and dried at 95° C.

The resulting as-synthesized product was analyzed by powder XRD and shown to be SSZ-85 with no observable AFI framework type materials.

A SEM image of the as-synthesized product is shown in FIG. 1 and indicates a uniform field of very small needle-like crystals.

Elemental analysis results for the as-synthesized product are presented in Table 4 below. The results for Co, Al, P, and O are reported as averages based on 20 samplings.

TABLE 4

| Element | Wt. % | Atomic % |
|---|---|---|
| Co, wt. % | 2.2 ± 0.8 | 0.8 ± 0.3 |
| Al, wt. % | 18.9 ± 2.5 | 13.7 ± 2.0 |
| P, wt. % | 18.2 ± 2.5 | 11.5 ± 1.9 |
| O, wt. % | 60.7 ± 4.1 | 74.0 ± 3.3 |
| C, wt % | 3.6 | — |
| N, wt. % | 1 | — |

Example 2

The as-synthesized product from Example 1 was calcined inside a muffle furnace under a flow of 2% oxygen/98% nitrogen heated to 300° C. at a rate of 1° C./min and held at 300° C. for five hours and cooled to ambient temperature.

Example 3

Micropore Volume Analysis

Figure 2:
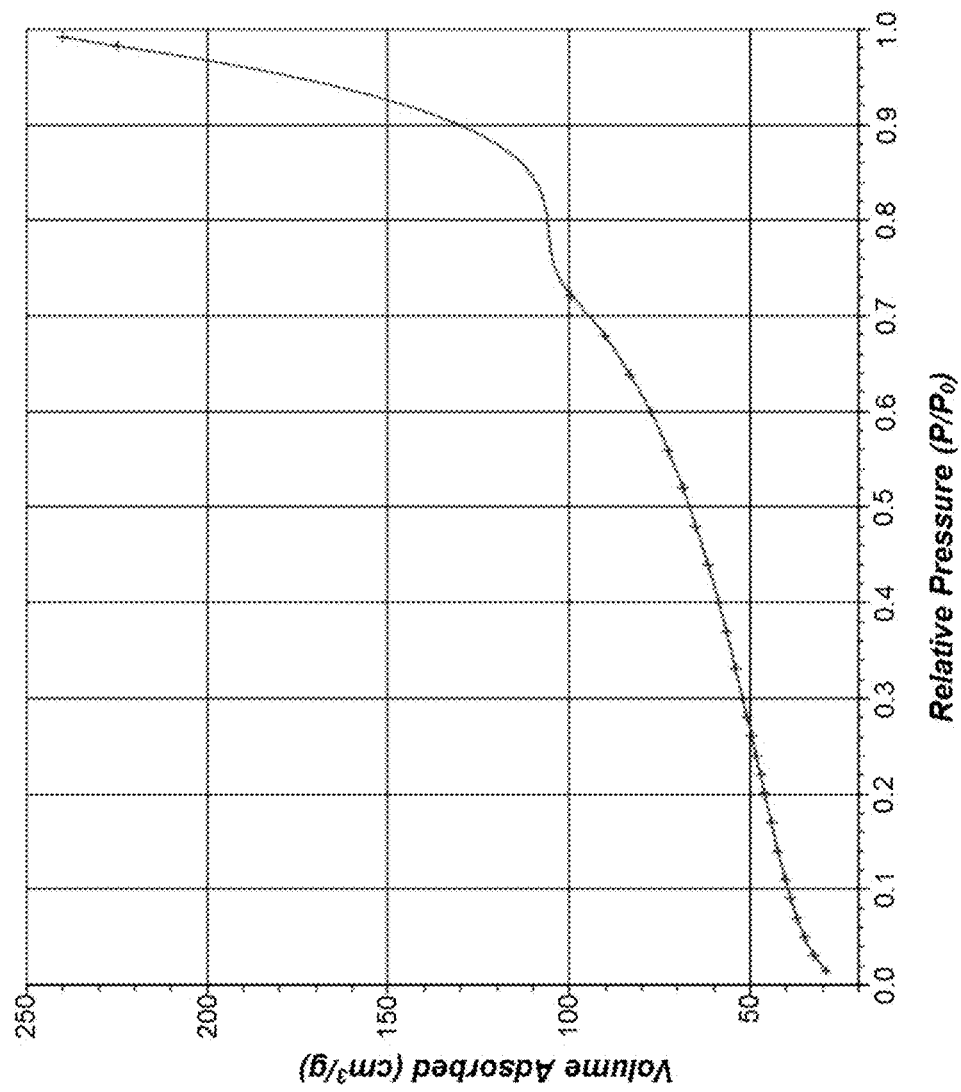
FIG. 2 is a $N_2$ adsorption isotherm plot at 77 K of the calcined molecular sieve of Example 2.

The calcined molecular sieve of Example 2 was subjected to micropore analysis using $N_2$ as the adsorbate and via the B.E.T. method. FIG. 2 is a $N_2$ adsorption isotherm plot of the calcined molecular sieve and shows that the material has a modest micropore volume when calcined at 300° C.

Example 4

Brønsted Acidity

Brønsted acidity of the calcined molecular sieve of Example 2 was determined by isopropylamine-temperature-programmed desorption (IPam TPD) adapted from the published descriptions by T. J. Gricus Kofke et al. (*J. Catal.* 1988, 114, 34-45), T. J. Gricus Kofke et al. (*J. Catal.* 1989, 115, 265-272), and J. G. Tittensor et al. (*J. Catal.* 1992, 138, 714-720). A sample was pre-treated at 400° C.-500° C. for 1 hour in flowing dry $H_2$. The dehydrated sample was then cooled down to 120° C. in flowing dry helium and held at 120° C. for 30 minutes in a flowing helium saturated with isopropylamine for adsorption. The isopropylamine-saturated sample was then heated up to 500° C. at a rate of 10° C./min in flowing dry helium. The Brønsted acidity was calculated based on the weight loss vs. temperature by thermogravimetric analysis (TGA) and effluent $NH_3$ and propene by mass spectrometry.

The sample had a Brønsted acidity of 41 µmol/g.

The invention claimed is:

1. A method of preparing molecular sieve SSZ-85 comprising contacting under crystallization conditions a reaction mixture comprising a source of cobalt, a source of aluminum, a source of phosphorus, and an ionic liquid comprising a 1,3-diisopropylimidazolium cation; wherein the reaction mixture is substantially free of fluoride ions.

2. The method of claim 1, wherein the reaction mixture has a composition, in terms of molar ratios, as follows:

| | |
|---|---|
| $CoO/Al_2O_3$ | 0.05 to 0.5 |
| $P_2O_5/(CoO + Al_2O_3)$ | 0.5 to 1.5 |
| $[Q^+A^-]/(CoO + Al_2O_3)$ | 1 to 100 | wherein $[Q^+A^-]$ represents an ionic liquid comprising a 1,3-diisopropylimidazolium cation ($Q^+$) and an anion ($A^-$) which is not detrimental to the formation of the molecular sieve.

3. The method of claim 1, wherein the reaction mixture has a composition, in terms of molar ratios, as follows:

| | |
|---|---|
| $CoO/Al_2O_3$ | 0.05 to 0.5 |
| $P_2O_5/(CoO + Al_2O_3)$ | 0.8 to 1.2 |
| $[Q^+A^-]/Al_2O_3$ | 2 to 50. | wherein $[Q^+A^-]$ represents an ionic liquid comprising a 1,3-diisopropylimidazolium cation ($Q^+$) and an anion ($A^-$) which is not detrimental to the formation of the molecular sieve.

4. The method of claim 1, wherein the crystallizations conditions include a temperature of from 100° C. to 135° C.

* * * * *